United States Patent [19]
Colgate

[11] 4,020,317
[45] Apr. 26, 1977

[54] METHOD OF MINING ROCK WITH AN ELECTRON BEAM

[75] Inventor: Stirling A. Colgate, Socorro, N. Mex.

[73] Assignee: New Mexico Tech Research Foundation, Socorro, N. Mex. ; a part interest

[22] Filed: Nov. 13, 1974

[21] Appl. No.: 523,514

Related U.S. Application Data

[63] Continuation of Ser. No. 30,912, Dec. 10, 1971, abandoned.

[52] U.S. Cl. .......... 219/121 EM; 299/14; 241/1; 175/16; 125/1
[51] Int. Cl.² ................ B23K 15/00
[58] Field of Search ........ 219/121 EB, 121 EM, 219/121 L, 121 LM; 250/492; 175/11, 16, 57; 241/1; 299/10, 14, 16, 95

[56] References Cited
UNITED STATES PATENTS

| | | | |
|---|---|---|---|
| 3,556,600 | 1/1971 | Shoupp et al. | 219/121 EM |
| 3,610,871 | 10/1971 | Lumley | 219/121 L |
| 3,629,545 | 12/1971 | Graham et al. | 219/121 L |
| 3,842,279 | 10/1974 | Schumachen | 250/397 |

Primary Examiner—Bruce A. Reynolds
Assistant Examiner—G. R. Peterson
Attorney, Agent, or Firm—Brumbaugh, Graves, Donohue & Raymond

[57] ABSTRACT

A method of mining rock utilizes a high-intensity electron beam to break the rock. The electron beam is directed onto the surface of the rock, and has sufficient energy either to ablate the rock at the zone of beam impingement and generate an ablation pressure that is sufficiently high to fracture the rock or to expand thermally the rock and generate a dynamic pressure in a lateral direction to fracture the rock. The electron beam is moved along the surface of the rock at a speed in phase with the speed of crack propagation in the rock.

7 Claims, 4 Drawing Figures

INVENTOR
STERLING A. COLGATE
BY
Brumbaugh, Graves, Donohue + Raymond
his ATTORNEYS

METHOD OF MINING ROCK WITH AN ELECTRON BEAM

This is a continuation, of application Ser. No. 30,912, now abandoned.

BACKGROUND OF THE INVENTION

This invention relates to breaking of solid materials, such as rock, with an electron beam, and particularly to a method of mining rock utilizing a high energy electron beam to fracture the rock.

The mining of rock by conventional methods has been limited as to the rate and cost of production of rock rubble by the slow and laborious steps of sequential drilling, blasting, and mucking. Furthermore, there are obvious dangers inherent in drilling and blasting of rock. The noise and air pollution factors also present restrictions and problems. Blasting normally produces large pieces that must be broken up, and the capital and operating costs of machinery to break up the rock into desired sizes are high. The machinery is also subject to inexorable wear and failure of the moving parts and erosion and frequent replacement of the parts which contact and break the rock.

SUMMARY OF THE INVENTION

There is provided, in accordance with the invention, a method of producing rock rubble by utilizing an electron beam, which, upon being directed at the surface of the rock, generates sufficient heat at the zone of impingement that the rock fractures. The beam precipitates fracture either by ablating the rock and generating a resultant ablation pressure which is sufficient to fracture the rock or by thermally expanding the rock in such a short time that the resultant dynamical pressure is sufficient to fracture the rock.

Electron beam mining according to the present invention is capable of producing rock rubble at high rates and at low cost. At prevalent rates for electric power, the energy cost for producing rock rubble is only about one cent per ton. The electron beam generator, which has no moving parts, has a long, useful life and is capable of producing rock rubble at a rate in the range of 10 to 20 tons per second. A further advantage is that the rock rubble is produced at a size which is relatively consistent, since the size of the rubble is determined by the closeness of the electron beam relative to a surface of the rock, rather than solely by the fracture propagation characteristics of the rock, which is the primary factor affecting rubble size in blasting.

DESCRIPTION OF EXEMPLARY EMBODIMENT

Figure 1:
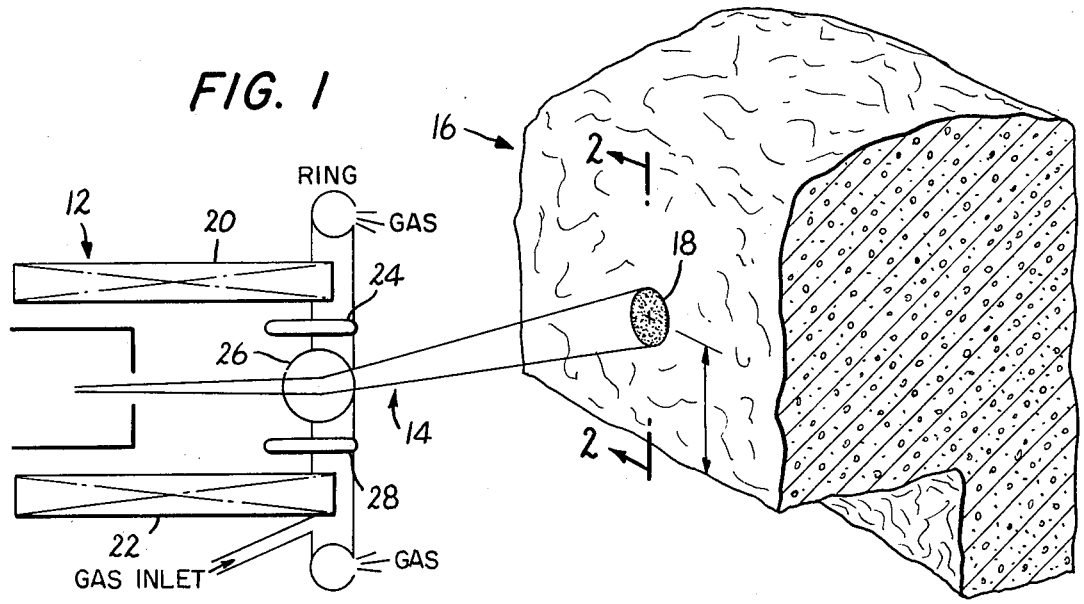
FIG. 1 is a schematic representation of the method and of apparatus for carrying it out.
Figure 2:
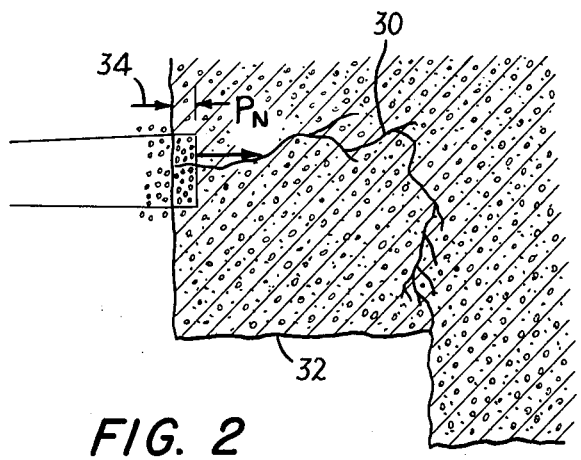
FIG. 2 is a cross-sectional schematic view depicting the propagation of a crack into the rock.

In FIG. 1, the method is depicted by way of schematic illustration of apparatus for carrying it out and in the environment of removing and breaking up rock along a generally vertical rock face. In particular, an electron beam generator 12 produces an electron beam 14 which is directed at a rock face 16 over an area or zone of impingement 18. If the power density of any energy source, such as an electron beam, incident upon matter is high enough, the matter in question ablates, i.e., evaporates. This results in an ablation pressure which appears as a reaction pressure against the material. Since the ablation pressure is a function of the rate of ablation, and since the rate of ablation is determined by the available power density at the zone of impingement 18, an ablation pressure sufficient to fracture the material can be generated by an electron beam having sufficient power density at the zone of impingement. Thus, the method, according to the invention, involves generation of the electron beam 14 and focusing the beam on an area at the surface of the rock to be mined so that the power density at the impingement area is sufficient to heat the material to a temperature above its vaporization point. As the rock vaporizes, the reaction pressure of the vaporizing gases appears as a localized pressure on the rock which is exerted normal to the rock surface 16 in the direction of the arrow $P_n$ (FIG. 2). This pressure is sufficiently high that the rock fractures locally to produce rock rubble.

The parameters the electron beam 14 must have to cause the rock to fracture are a function of the ablation and fracture characteristics of the rock. The ablation pressure generated corresponds to the time rate of change of momentum of the ablating gases, and is exerted uniformly at the zone of impingement 18. The time rate of change of momentum corresponds to the mass rate; that is, the mass being ejected per second per unit area times the velocity at which it is ejected. The reaction pressure at the point of contact, $p$, may thus be expressed by the equation:

$$p = \rho\, uv \text{ dynes/cm}^2 \qquad [1]$$

where $\rho$ is the density of the solid material, $u$ is the velocity of conversion of solid matter to vapor, and $v$ is the velocity of ejection of mass. Since the velocity of ejection, $v$, is very close to the thermal velocity of the gas of the material at its vaporization temperature, the value for the thermal velocity may be substituted for the velocity of ejection, $v$. For the usual temperature of evaporation of rock, this thermal velocity is roughly $10^5$ cm/sec. Substituting this value in Equation 1:

$$p = 10^5\, \rho\, u \text{ dynes/cm}^2 \qquad [2]$$

The total unit energy, Q, that must be supplied by the electron beam to vaporize one gram of material is the energy required to heat the material to the vaporization temperature, plus the latent heat of vaporization, plus any additional internal energy of the vaporized gases. The power density, $w$, required to vaporize the material at a velocity of conversion of solid matter to vapor, $u$, may be expressed as a function of the total vaporization energy, Q:

$$w = Q\, \rho\, u \text{ watts/cm}^2 \qquad [3]$$

For example, a typical value for the total unit energy, Q, is approximately 5,000 joules/gm for rocks such as limestone. Upon substituting this value into Equation 3, the power density, $w$, may be expressed:

$$w = 5000\, \rho\, u \text{ watts/cm}^2 \qquad [4]$$

Substituting $\rho u = p/10^5$ cm/sec. from Equation 2 into Equation 4 gives:

$$w = 0.05\, p \text{ watts/cm}^2 \quad [5]$$

Rock typically fractures at a pressure normal to the surface between 50,000 to 100,000 psi. If a fracture pressure of 70,000 psi is assumed, corresponding to $5\times10^9$ dynes/cm$^2$, Equation 5 may be solved for the power density, $w$, required to obtain an ablation pressure of 70,000 psi, and upon solving Equation 5, the power density, $w$, is found to be $2.5\times10^8$ watts/cm$^2$. Since this is also the power density which the electron beam 14 must have at the zone impingement 18, the power rate of the electron beam can now be determined for a known area of the zone of impingement 18. For example, for a zone of impingement 18 which is ½ cm in diameter, the beam power rate is 50,000 kilowatts.

The above calculations can be used to determine the ablation pressure where the zone of impingement 18 is at free surface of the rock. On the other hand, for an electron beam 14 which penetrates into the crack that is being propagated, a confined pressure due to the ablation gases is generated which is significantly larger than this free surface ablation pressure and the beam power rate may be correspondingly reduced. Although the increase in value for this confined pressure over the free surface ablation pressure cannot be accurately predicted, since it depends in detail upon the fracture geometry and the properties of the gas, as well as the particular power density of the electron beam, the increase in pressure may be empirically determined, after which the beam power rate can be correspondingly reduced. If, for example, the confined pressure in the crack is found to be augmented by a factor of 10 over the free ablation pressure, the peak beam power rate may be reduced by this factor.

The calculations thus far presented can be used to determine the minimum energy density of the electron beam at the zone of impingement 18 on the rock surface. The total electron beam power required is the product of the power density at the zone of impingement 18 and the area of the zone of impingement 18. Thus, as the area of the zone of impingement 18 is reduced, the input power required may be correspondingly decreased. The minimum area of the zone of impingement 18 is dependent on two factors: (1) the ability to focus the electron beam 14 from the electron beam generator 12, after it has traveled through air to the target area, and (2) the requirement that the beam 14 dwell long enough on a given point on the surface of the rock 16 so that the rock is heated to the ablation temperature throughout the full depth of electron beam penetration 34 (FIG. 2).

With regard to the first factor, the primary focusing of the electron beam 14 is accomplished in the electron beam generator 12 by focusing coils 20 and 22. After ejection from the electron beam generator 12, however, the electron beam 14 is subject to multiple scattering in the air. For example, for a 1,000,000 volt electron beam, which heats the air through which it travels to a mean temperature of several thousand degrees centigrade, and with the electron beam generator 12 located one meter from the rock surface 16, the diameter of the zone of impingement 18 will be roughly ten centimeters. The ability to focus the electron beam 14 may be improved by the application of a weak magnetic field extending to the rock surface 16 and by providing a light gas blanket throughout the travel of the electron beam 14 of helium or hydrogen. For example, a magnetic field of 100 gauss in conjunction with a light gas blanket results in a minimum diameter for the zone of impingement 18 of less than ½ cm for a 2,000,000 volt electron beam generated by a gun 12 located one meter from the rock surface 16.

The electron beam generator 12 is equipped with deflection coils 24, 26 and 28 so that the electron beam may be deflected sequentially to scan the rock surface 16. Thus an electron beam generator 12 in a single location can fracture a relatively large quantity of the rock. With reference to FIG. 2, the scanning pattern is determined by the extent of the propagation of the crack 30 away from the zone of impingement 18. The crack 30 propagates in the rock to the extent that the local stress is greater than the yield strength of the material. In the case of an electron beam creating an ablation pressure at least ten times the yield strength of the material, the crack 30 propagates in a direction roughly normal to the rock surface 16 for a distance of twenty to thirty times the dimension of the zone of impingement 18. If, for example, an electron beam 14 is generated having a zone of impingement 18 which is ½ cm in diameter, the penetration of the crack 30 in the rock is approximately 10 centimeters. If this beam is sequentially deflected to scan a pattern 10 centimeters away from a free surface 32, a quantity of rock having a cross-sectional area of 10 × 10 cm$^2$ is removed.

As the electron beam 14 is thus moved, however, the second consideration, that of the total beam heat required to ablate the rock to the full depth of electron beam penetration 34, becomes important. The penetration in rock 34 of the electron beam 14 is a function of the energy possessed by the electrons in the beam upon striking the rock. Assuming that a 2,000,00 volt beam is produced by the electron beam generator 12, and neglecting the voltage loss of a beam traveling through several meters of air heated to several thousand degrees centigrade, which is less than 100 kilovolts, the penetration is approximately ½ cm/gm. Since the mean density of rock is 2 gm/cc, the penetration distance 34 is ¼ cm. For the volume element of rock contained within a square centimeter of the surface 18 to this depth of ¼ cm, the mass is ½ gm, and the corresponding total vaporization energy, Q, is 2,500 joules, provided the energy deposition of the electron beam 14 as a function of depth is uniform. (Actually, the electron beam deposits a greater energy at the end of its penetration by a factor 2 to 4, so that the minimum energy required to vaporize the rock at the end of the beam penetration is roughly 800 joules/cm$^2$). Recallling that the energy density of the electron beam to generate the required ablation pressure is $2.5\times10^8$ watts/cm$^2$, the length of time the electron beam 14 must dwell on any given point on the rock surface 16 to deposit 2,500 joules/cm$^2$ is found to be $5\times10^{-6}$ sec.

Figure 3:
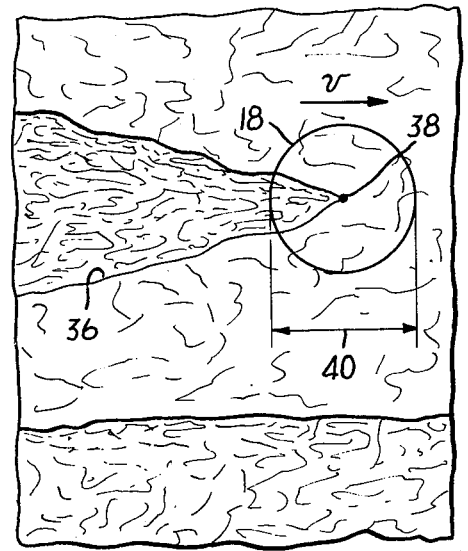
FIG. 3 is a schematic view of a rock face depicting crack propagation generated by a moving electron beam.

In FIG. 3 the electron beam 14 is incident the surface of the rock at a zone of impingement 18. The electron beam 14 is being moved in the direction of the arrow $v$, after having traversed the rock surface to this point and having generated a crack in the rock 36. The zone of impingement 18 is symmetrically disposed about a fracture tip 38.

It is known to a person skilled in the art, as a result of recent numerical hydrodynamic elastic calculations, that cracks propagate in uniaxially stressed material and result in strain energy accumulations at the crack tip 38. For crack propagation velocities greater than that of a straight line rupture velocity, it is also known that an accumulation of strain energy at the fracture tip can result in bifurcation or splaying of the fracture tip, since the dynamic stress field in the region of the fracture tip transforms into at least two maximum shear stress regions divergent from the straight line path of the fracture. These calculations show that a crack can be generated with much less energy than that corresponding to the strain energy statically required throughout the bulk of the material if the energy for breaking the rock is continuously applied at the fracture tip 38. It is one feature of the present invention that the electron beam fracturing of rock or materials is accomplished by moving or phasing the point of contact or zone of impingement 18 of the electron beam 14 at a velocity corresponding to the straight line crack propagation speed of the material. This straight line crack propagation speed has been determined to be roughly ⅓ of the dilatational wave speed in the material, and for typical rocks or metals it is $10^5$ cm/sec.

Once the required velocity of scanning of the electron beam 14 is established, the minimum diameter of the zone of impingement 18 may be determined. If the beam is scanned across the surface in phase with the straight line crack propagation velocity of $10^5$ cm/sec, and, as above determined, any one point on the rock surface must be exposed to the electron beam 14 for $5 \times 10^{-6}$ seconds, then the zone of impingement 18 must have a minimum width 40 of ½ cm. This minimum width 40 is also the minimum diameter of the zone of impingement 18, which corresponds to a cross-sectional area of the zone of impingement 18 of 1/5 cm². For this cross-sectional area, and using the value determined above for the minimum beam energy density of $2.5 \times 10^8$ watts/cm², the minimum total beam power required is $5 \times 10^7$ watts (50,000 kilowatts). If the voltage of the electron beam 14 is 2,000,000 volts, this means that the current must be 25 amperes. Electron beam generators 12 capable of generating 2,000,000 volts at 25 amperes and focusing to the required area of the zone of impingement 18 are well within the present state of the art.

Figure 4:
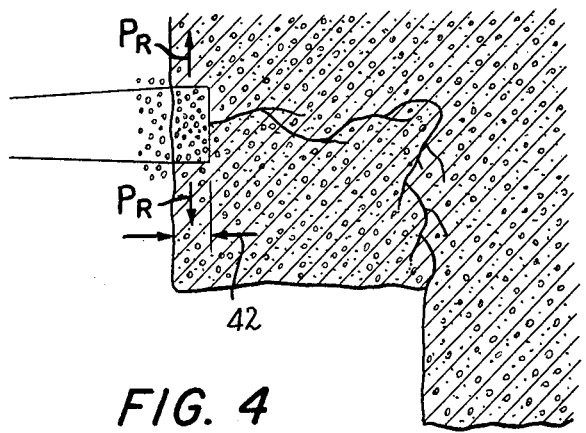
FIG. 4 is a schematic cross-sectional view of rock depicting the fracture pressure created by thermal expansion.

A second embodiment of the present invention is shown in FIG. 4. For certain rocks, particularly those of high alumina content, the total energy, Q, required to ablate the rock is much larger than the 5,000 joules/gm assumed above. This means that the beam energy rate required to generate an ablation pressure large enough to fracture the rock must be much larger than the 50,000 kilowatts determined above. Rather than increase the energy rate of the electron beam to generate the required ablation pressure, the same energy which is sufficient to fracture the rock by ablation instead heats the material to a sufficiently high temperature so that the fractional expansion is 2 to 5 percent and occurs in such a short time that a dynamical pressure large enough to fracture the rock is generated.

If the beam parameters discussed above for ablation are used, the time required to heat a volume element of rock contained within a surface area of ⅓ cm² and a depth 42 of ¼ cm is $3 \times 10^{-6}$ sec. The acceleration of the rock is then $3 \times 10^8$ cm/sec², and the dynamical pressure is 10,000 psi, which is exerted in the lateral direction, as schematically indicated by the arrows $P_R$. Although the final pressure resulting from ablation is significantly higher, since the pressure caused by thermal expansion is exerted in the lateral direction, it is approximately as effective in phased fracture propagation as the ablation pressure, which is exerted normal to the rock surface 16.

The rate and cost of producing rock rubble by phased electron beam fracturing may be determined using the above circulations. At the beam scanning speed of $10^5$ cm/sec, and for a beam guided continuously to scan a pattern 10 cm away from a free surface 32, the total volume of rock removed per second is $10^7$ cc/sec. For the mean density of 2 gm/cc for the rock, this corresponds to a production rate of 20 tons of fractured rock per second. Since 2.5 joules are required to remove 1 gram of rock, corresponding to $2.5 \times 10^6$ joules to remove 1 ton of rock, the power requirement for producing rock rubble according to the present invention is low — roughly 1 kilowatt-hour per ton of rock fractured. For a purchase cost of 1 cent per kilowatt-hour, the power cost per ton of rock fractured is only 1 cent.

Many methods are commonly available for avoiding any instantaneous or residual radiation dangers resulting from the mining of rock according to the present invention. For example, a human operator may be protected from instantaneous gamma radiation from the material face either by providing heavy shielding or by being located remote from the vicinity of the electron beam, in which case equipment may be controlled, for example, by television monitoring, as in many other remote-controlled applications. So long as the electron beam energy is less than about 2.5 million volts, the residual, long-term radioactivity produced by the electron beam is small.

The above-described embodiment of the invention is intended to be merely exemplary, and those skilled in the art may make numerous modifications and variations without departing from the spirit and scope of the invention. All such modifications and variations are intended to be included within the scope of the invention, as defined in the appended claims.

I claim:

1. A method of breaking rock, comprising the steps of directing onto the surface of the rock an electron beam having an energy density of the order $2.5 \times 10^8$ watts/cm² to ablate the rock and produce an ablation pressure normal to the surface of the rock at the zone of impingement of the beam of from about 50,000 to 100,000 psi, such ablation pressure beng sufficient to fracture the rock, and magnetically deflecting the electron beam to move it across the rock surface at a velocity that is in phase with the speed of crack propagation in the rock, namely, about one-third of the dilatational wave speed in the rock.

2. A method according to claim 1 and further comprising the step of controlling the width of the zone of impingement of the electron beam on the rock, said width being measured in the direction of motion of the electron beam, so that the electron beam impinges on a given point on the surface of the rock for a sufficient length of time to ablate the rock to a depth generally corresponding to the penetration in the material of the electron beam.

3. A method according to claim 2 and further comprising the steps of focusing the beam to cause it to have a diameter of about ½ cm (area, about 1/5 cm²) and wherein in the step of magnetically deflecting the beam, the beam is caused to move across the rock at a velocity such that the dwell time of beam at any given point is on the order of $5 \times 10^{-6}$ sec., and wherein in the step of directing the beam, the beam power rate is caused to be on the order of $5 \times 10^7$ watts.

4. A method according to claim 1 and further comprising the step of generating a magnetic field between the electron beam generator and the rock surface.

5. A method according to claim 1 and further comprising the step of providing a blanket of a light molecular weight gas between the electron beam generator and the rock surface.

6. A method according to claim 1 in which the step of magnetically the beam includes moving the beam across the rock surface by sequentially deflecting the beam back and forth to scan the rock surface along a multiplicity of substantially parallel spaced-apart paths.

7. A method according to claim 1 in which in the step of magnetically deflecting the electron beam, the beam is moved across the rock surface at a speed of about $2.4 \times 10^6$ inches per minute ($10^5$ cm/sec.).

* * * * *

UNITED STATES PATENT AND TRADEMARK OFFICE
CERTIFICATE OF CORRECTION

PATENT NO. : 4,020,317
DATED : April 26, 1977
INVENTOR(S) : Stirling A. Colgate

It is certified that error appears in the above-identified patent and that said Letters Patent are hereby corrected as shown below:

Column 3, line 14, after "zone" insert --of--; Column 4, line 52, after "factor" insert --of--; Column 6, line 9, "circulations" should be --calculations--; line 45, after "order" insert --of--; Column 7, line 1, after "of" insert --the--; and Column 8, line 3, after "magnetically" insert --deflecting--.

Signed and Sealed this twenty-third Day of August 1977

[SEAL]

Attest:

RUTH C. MASON
Attesting Officer

C. MARSHALL DANN
Commissioner of Patents and Trademarks